(12) United States Patent
Mochizuki et al.

(10) Patent No.: US 9,927,303 B2
(45) Date of Patent: Mar. 27, 2018

(54) TEMPERATURE SENSOR FOR HIGH TEMPERATURE

(71) Applicant: Okazaki Manufacturing Company, Hyogo (JP)

(72) Inventors: Mitsuaki Mochizuki, Hyogo (JP); Takashi Mihara, Hyogo (JP)

(73) Assignee: OKAZAKI MANUFACTURING COMPANY, Hyogo (JP)

( * ) Notice: Subject to any disclaimer, the term of this patent is extended or adjusted under 35 U.S.C. 154(b) by 445 days.

(21) Appl. No.: 14/415,015

(22) PCT Filed: Jan. 21, 2014

(86) PCT No.: PCT/JP2014/000282
§ 371 (c)(1),
(2) Date: Jan. 15, 2015

(87) PCT Pub. No.: WO2015/111094
PCT Pub. Date: Jul. 30, 2015

(65) Prior Publication Data
US 2016/0018268 A1      Jan. 21, 2016

(51) Int. Cl.
*G01K 7/18* (2006.01)
*G01K 1/12* (2006.01)
*G01K 1/08* (2006.01)

(52) U.S. Cl.
CPC ............. *G01K 1/12* (2013.01); *G01K 1/08* (2013.01); *G01K 7/18* (2013.01)

(58) Field of Classification Search
CPC ................................. G01K 7/18; G01K 7/16

USPC .......... 374/163, 185, 208, 179; 338/28, 22 R
See application file for complete search history.

(56) References Cited

U.S. PATENT DOCUMENTS

| | | | | |
|---|---|---|---|---|
| 2,588,014 A | * | 3/1952 | Knudsen .................. | G01K 1/08 29/612 |
| 3,499,217 A | * | 3/1970 | Mitsuaki .................. | G01K 1/08 29/612 |
| 5,071,258 A | * | 12/1991 | Usher ..................... | G01K 1/105 136/232 |
| 5,181,779 A | * | 1/1993 | Shia ........................ | G01K 7/04 136/232 |

(Continued)

FOREIGN PATENT DOCUMENTS

| JP | 44-29830 | 12/1969 |
|---|---|---|
| JP | 57-126035 U | 8/1982 |

(Continued)

*Primary Examiner* — Gail Kaplan Verbitsky
(74) *Attorney, Agent, or Firm* — Pearne & Gordon LLP (57) ABSTRACT

In order to solve a technical problem of a temperature sensor for high temperature, in which platinum lead wires may be broken when used at a high temperature, an inner frame (8) made of ceramic is provided inside an outer frame (7) made of metal, the inner frame (8) is fixed, only at the upper end portion thereof, to the outer frame (7), and an insulating filler (9) made of a ceramic adhesive or a ceramic powder tightly filled at a high density is filled inside the inner frame (8) and a portion inside the outer frame (7) where the inner frame (8) is not present. According to this configuration, the occurrence of a break in platinum lead wires (6) can be significantly lowered compared with that of conventional examples.

6 Claims, 4 Drawing Sheets

(56) References Cited

U.S. PATENT DOCUMENTS

| | | | | |
|---|---|---|---|---|
| 5,999,081 | A * | 12/1999 | Hannigan | G01K 1/10 338/229 |
| 6,272,735 | B1 * | 8/2001 | Moriwake | G01K 1/12 29/612 |
| 6,997,604 | B2 * | 2/2006 | Hanzawa | G01K 13/02 140/149 |
| 2004/0141545 | A1 * | 7/2004 | Hoshisashi | G01K 13/02 374/208 |
| 2007/0171959 | A1 * | 7/2007 | Irrgang | G01K 1/10 374/185 |
| 2011/0158287 | A1 * | 6/2011 | Clark | G01D 11/245 374/185 |
| 2012/0294330 | A1 * | 11/2012 | Fujimoto | G01K 1/16 374/143 |
| 2013/0128925 | A1 * | 5/2013 | Hoenicka | G01K 1/08 374/208 |
| 2014/0092940 | A1 * | 4/2014 | Suzuki | G01K 7/22 374/185 |
| 2015/0292954 | A1 * | 10/2015 | Takeda | G01K 1/08 374/183 |
| 2017/0191879 | A1 * | 7/2017 | Martin | G01K 7/02 |

FOREIGN PATENT DOCUMENTS

| | | |
|---|---|---|
| JP | 06-347339 A | 12/1994 |
| JP | 2003-179276 A | 6/2003 |

\* cited by examiner

TEMPERATURE SENSOR FOR HIGH TEMPERATURE

TECHNICAL FIELD

The present invention relates to a temperature sensor in which a platinum resistance thermometer element is accommodated in a metal outer frame, for use in a high temperature environment.

BACKGROUND ART

It is possible to measure a temperature using platinum resistance thermometer elements, more precisely than using other temperature sensors such as thermocouples. Thus, platinum resistance thermometer elements are widely used in the case where precise temperature measurement is required.

Examples of commonly used platinum resistance thermometer elements include an element in which a coiled platinum resistance wire is accommodated in a ceramic insulator (FIG. 1 of JP S57-126035U) and an element in which a platinum resistance wire wound around a glass bobbin is coated by glass (FIG. 4 of JP S44-29830B), and further include an element in which a platinum thin film in the form of a meandering wire is formed on a thin film made of ceramic or the like to form a platinum resistance wire, and the surface thereof is insulated by coating (JP 2003-179276A). Since the electrical resistance of a platinum resistance wire changes in accordance with the temperature, temperature measurement using a platinum resistance thermometer element is performed by measuring the electrical resistance of a platinum resistance wire, and converting the obtained value into the temperature.

In a platinum resistance thermometer element, a platinum resistance wire is protected by a member made of a fragile material such as ceramic or glass as described above. Thus, an external force such as vibrations may damage the protective member, resulting in a break or short-circuit in the platinum resistance wire.

Thus, it is uncommon for a platinum resistance thermometer element to be used alone as a temperature sensor, and the platinum resistance thermometer element is usually used as a temperature sensor in the form where the resistance thermometer element is accommodated in an outer frame made of metal or the like, for example, as shown in Patent Document 1.

Figure 4:
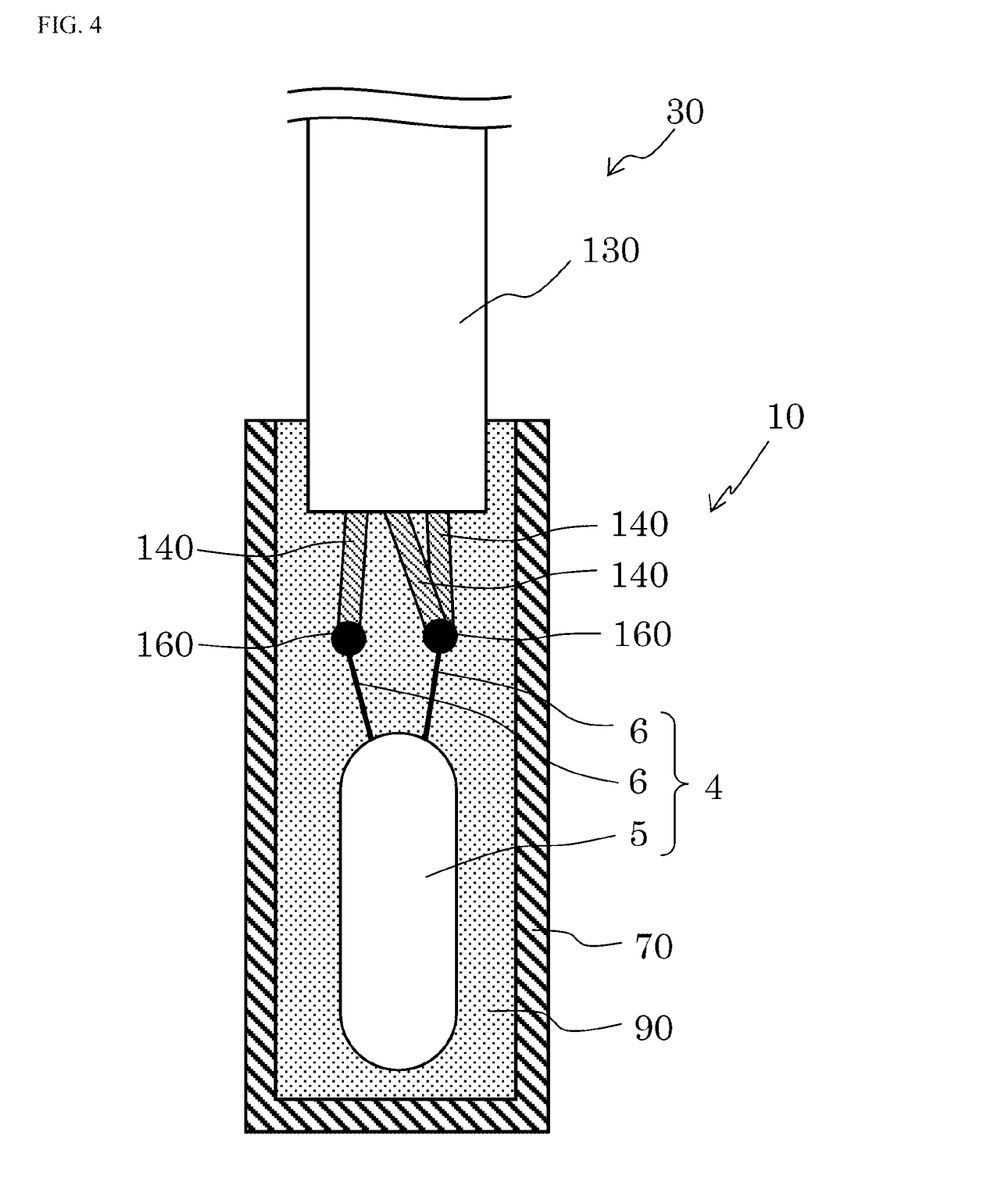
FIG. 4 is a cross-sectional view showing a conventional temperature sensor using a platinum resistance thermometer element.

FIG. 4 is a cross-sectional view showing a structure widely used in a temperature sensor using a platinum resistance thermometer element. A temperature sensor 10 is configured such that a platinum resistance thermometer element 4 is fixed via an insulating filler 90 in a metal outer frame 70. Regardless of the type of the platinum resistance thermometer element 4, platinum lead wires 6 connected to a platinum resistance wire are usually exposed from a platinum resistance thermometer element main body 5 containing the platinum resistance wire, and ends of the platinum lead wires 6 and ends 160 of three electric conductive wires 140 of a three-wire cable 30 for measuring the electrical resistance of the platinum resistance wire are connected by welding.

Although FIG. 4 is a cross-sectional view, the platinum resistance thermometer element 4 and a cover 130 of the cable 30 are shown in the external shapes thereof for facilitating visualization. As is known, types of the temperature measurement using a platinum resistance thermometer element include two-wire measurement, three-wire measurement, and four-wire measurement, among which three-wire measurement is most widely used in the industrial field. FIG. 4 shows a case of three-wire measurement in which the three electric conductive wires 140 of the cable 30 are connected to the platinum lead wires 6 exposed from the platinum resistance thermometer element main body 5.

In the description below, a "temperature sensor for high temperature" refers to a temperature sensor for high temperature using a platinum resistance thermometer element.

Regarding the insulating filler 90, since a ceramic adhesive has excellent thermal resistance and the same is applied to a ceramic powder, a ceramic adhesive or a ceramic powder tightly filled at a high density is used as the insulating filler 90 in a temperature sensor for high temperature used in a high temperature range over 200° C. A ceramic powder is tightly filled at a high density in order to achieve good thermal conduction so as not to impair the response speed in the temperature measurement. Furthermore, the cable 30, in the case of the temperature sensor for high temperature, is a so-called MI cable in which the three electric conductive wires 140 are accommodated via a ceramic powder in the cover 130 configured by a metal sheath, in order to achieve good thermal resistance. Note that the maximum temperature of a platinum resistance thermometer element as defined in IEC Standard and JIS Standard is 850° C.

Furthermore, a "ceramic adhesive" refers to a ceramic-based adhesive mainly made of ceramic.

When a ceramic powder tightly filled at a high density is used as the insulating filler 90, the ceramic powder may absorb moisture and deteriorate in the insulation resistance, causing errors in the temperature measurement, and, thus, the metal outer frame 70 is usually provided with a lid, and the lid is welded or brazed to the outer frame 70 and the metal sheath of the cable 30, so that the ceramic powder accommodated inside is shielded from the outside air, thereby preventing errors in the temperature measurement.

PRIOR ART DOCUMENT

Patent Document

Patent Document 1: JP H06-347339A

SUMMARY OF INVENTION

Problem to be Solved by the Invention

Temperature sensors for high temperature having the conventional structure shown in FIG. 4 are problematic in that there are cases where the platinum lead wires 6 are broken when used at a high temperature. In addition, these temperature sensors are problematic also in that the wires are more frequently broken when used in an environment where the temperature repeatedly and significantly changes between a high temperature and a low temperature.

It is an object of the present invention to provide a temperature sensor for high temperature in which the occurrence of a break in wires is extremely lower than in conventional examples, even when used in a high temperature environment, especially when used in an environment where the temperature repeatedly and significantly changes between a high temperature and a low temperature.

Means for Solving the Problems

In order to solve the above-described problems, the following temperature sensor for high temperature is provided.

(First Aspect)

A first aspect of the present invention is directed to a temperature sensor for high temperature, provided at an end of an MI cable in which electric conductive wires are accommodated via an inorganic insulating powder in a metal sheath, including:

an outer frame made of metal, and having a bottomed tubular shape;

an inner frame made of ceramic, having a bottomed or non-bottomed tubular shape, and disposed inside the outer frame in a state where the inner frame is roughly in contact, at an outer side face thereof, with an inner side face of the outer frame, is roughly in contact, at a lower end face thereof, with an inner face of a bottom of the outer frame, and is fixed, at an upper end portion thereof, to the outer frame;

a platinum resistance thermometer element disposed inside the inner frame, configured by a platinum resistance thermometer element main body containing a platinum resistance wire, and platinum lead wires joined to the platinum resistance wire and partially exposed from the platinum resistance thermometer element main body, wherein ends of the platinum lead wires exposed from the platinum resistance thermometer element main body are joined to the electric conductive wires of the MI cable; and an insulating filler made of a ceramic adhesive or a ceramic powder tightly filled at a high density, and filled inside the inner frame and a portion inside the outer frame where the inner frame is not present.

Note that, as described above, a "ceramic adhesive" refers to a ceramic-based adhesive mainly made of ceramic.

As a result of research and study conducted on causes of a break in platinum lead wires exposed from a platinum resistance thermometer element main body in conventional temperature sensors for high temperature, it was found that such a break is mainly caused by a difference between coefficients of thermal expansion of a metal outer frame and platinum.

The outer frames of temperature sensors for high temperature as industrial products are most commonly made of stainless steel, and are sometimes made of nickel alloy such as corrosion-resistant and heat-resistant super alloy NCF. These metals each have a coefficient of thermal expansion larger than that of platinum. Furthermore, a ceramic adhesive or a ceramic powder used as the insulating filler has a coefficient of thermal expansion smaller than that of the outer frame material, and close to that of platinum. Table 1 shows approximate coefficients of thermal expansion of typically used materials.

TABLE 1

| Outer frame material: coefficient of thermal expansion | Ceramic material: coefficient of thermal expansion |
| --- | --- |
| SUS304 stainless steel: $18 \times 10^{-6}/°C$. | Alumina: $8 \times 10^{-6}/°C$. |
| SUS316 stainless steel: $18 \times 10^{-6}/°C$. | Zirconia: $11 \times 10^{-6}/°C$. |
| NCF600: $16 \times 10^{-6}/°C$. | Magnesia: $13 \times 10^{-6}/°C$. |
| Platinum (resistance wire, lead wire): coefficient of thermal expansion | |
| Platinum: $10 \times 10^{-6}/°C$. | |

According to the relationship between the coefficients of thermal expansion of these constituent materials, when a conventional temperature sensor for high temperature is used at a high temperature, the outer frame is expanded by heat and pulls the insulating filler having a small coefficient of thermal expansion, and, sometimes, the insulating filler is broken. When the insulating filler is pulled and broken, the platinum lead wires having a coefficient of thermal expansion smaller than that of the outer frame are pulled, and a tensile stress is generated in the wires. The platinum lead wires are broken mainly due to this stress. Furthermore, when used in an environment where the temperature repeatedly and significantly changes between a high temperature and a low temperature, the above-described tensile stress is repeatedly generated and cyclic fatigue is added, and, thus, the platinum lead wires are more frequently broken.

The temperature sensor for high temperature of the present invention is provided with a ceramic inner frame, and, thus, the occurrence of a break in the platinum lead wires is significantly lowered compared with that of conventional examples. The reason for this is that the inner frame and the insulating filler inside the inner frame are not pulled by significant thermal expansion of the outer frame because the inner frame is fixed, only at the upper end portion thereof, to the outer frame, and that stress generated in the platinum lead wires is reduced because ceramic, of which the inner frame and the insulating filler are made or mainly made, has a coefficient of thermal expansion close to that of platinum as shown in Table 1.

(Second Aspect)

A second aspect of the present invention is directed to the temperature sensor for high temperature according to the first aspect, wherein a material forming the inner frame, and a main material forming the ceramic adhesive of the insulating filler or a material forming the ceramic powder of the insulating filler are any of alumina, zirconia, and a mixture of alumina and zirconia.

Not only is there no stress from the outer frame to the platinum lead wires because the inner frame is provided as in the first aspect, but, according to the second aspect, there is almost no stress from the insulating filler because alumina and zirconia, both of which, among ceramic materials, have a coefficient of thermal expansion especially close to that of platinum as shown in Table 1. Thus, even when used in a high temperature environment or in an environment where the temperature repeatedly and significantly changes between a high temperature and a low temperature, the platinum lead wires can be substantially prevented from being broken.

Note that, since the electric conductive wires of the MI cable used are thick and have a relatively large coefficient of thermal expansion, the electric conductive wires are rarely broken. The same is applied to conventional temperature sensors for high temperature. Furthermore, since the platinum resistance wire in the platinum resistance thermometer element main body is coiled or meandering, an external force is easily absorbed, and the occurrence of a break in this wire is lower than that of the platinum lead wires.

(Third Aspect)

A third aspect of the present invention is directed to the temperature sensor for high temperature according to the second aspect, wherein a position in an axial direction of the upper end portion of the inner frame fixed to the outer frame substantially matches a position at which the ends of the platinum lead wires and the electric conductive wires of the MI cable are joined to each other.

According to the third aspect, a position in an axial direction of the upper end portion of the inner frame fixed to the outer frame substantially matches a position at which the ends of the platinum lead wires and the electric conductive wires of the MI cable are joined to each other. Thus, the occurrence of a break in the electric conductive wires of the MI cable, which occurs only rarely, can be further lowered.

The reason for this is that stress generated in the electric conductive wires of the MI cable for high temperature is reduced when they are outside the inner frame, the stress being generated because the electric conductive wires are usually formed from nickel or nickel alloy, both of which have a coefficient of thermal expansion closer to that of the metal forming the outer frame than to ceramic such as alumina or zirconia.

(Fourth Aspect)

A fourth aspect of the present invention is directed to the temperature sensor for high temperature according to any one of the first to the third aspects, further including:

an inner frame fixing member that is made of metal, and can press an upper face of the inner frame;

wherein the inner frame is provided, on an outer face of the upper end portion thereof, with a flange, the outer frame is provided, in an inner face of an upper portion thereof, with a step, by reducing a wall thickness of the upper portion, and the upper end portion of the inner frame is fixed to the outer frame by welding or brazing the inner frame fixing member and the outer frame to each other in a state where the flange on the inner frame is caught on the step in the outer frame and the inner frame is suspended on the outer frame, and an upper face of the flange on the inner frame is pressed by the inner frame fixing member.

According to this aspect, the upper end portion of the inner frame can be easily fixed to the outer frame.

(Fifth Aspect)

A fifth aspect of the present invention is directed to the temperature sensor for high temperature according to any one of the first to the third aspects, further including:

a lid that is made of metal, and can be attached to an opening at an upper portion of the outer frame;

wherein the inside of the outer frame is shielded from the outside air by welding or brazing the lid to the outer frame and the metal sheath of the MI cable.

Since a metal lid attached to an opening at an upper portion of the outer frame is welded or brazed to the outer frame and the metal sheath of the MI cable, the inside of the outer frame is shielded from the outside air. Thus, even when a ceramic powder that absorbs moisture is used as the insulating filler, there is no possibility that moisture is absorbed and lowers the insulating performance, causing errors in the temperature measurement.

(Sixth Aspect)

A sixth aspect of the present invention is directed to the temperature sensor for high temperature according to any one of the first to the third aspects, further including:

an inner frame fixing member that is made of metal, and can press an upper face of the inner frame; and a lid that is made of metal, and can be attached to an opening at an upper portion of the outer frame;

wherein the inner frame is provided, on an outer face of the upper end portion thereof, with a flange, the outer frame is provided, in an inner face of an upper portion thereof, with a step, by reducing a wall thickness of the upper portion, and the upper end portion of the inner frame is fixed to the outer frame, and the inside of the outer frame is shielded from the outside air, by welding or brazing the lid to the outer frame and the metal sheath of the MI cable in a state where the flange on the inner frame is caught on the step in the outer frame and the inner frame is suspended on the outer frame, the inner frame fixing member is placed on an upper face of the flange on the inner frame, the lid is attached to an upper face of the inner frame fixing member, and the upper face of the inner frame fixing member is pressed by the lid.

According to this aspect, an advantage can be achieved in which the process that welds or brazes the inner frame fixing member to the outer frame is no more necessary.

(Seventh Aspect)

A seventh aspect of the present invention is directed to the temperature sensor for high temperature according to the sixth aspect, wherein the inner frame fixing member is formed in one piece with the inner frame.

Not only is the process that welds or brazes the inner frame fixing member to the outer frame no more necessary, but, according to this aspect, the configuration can be made economically advantageous because the number of constituent members is reduced by forming the inner frame fixing member in one piece with the inner frame.

(Eighth Aspect)

An eighth aspect of the present invention is directed to the temperature sensor for high temperature according to any one of the first to the third aspects, wherein the platinum resistance thermometer element disposed inside the inner frame is configured by a plurality of platinum resistance thermometer elements that are connected in series by a platinum wire.

Effects of the Invention

The present invention provides a temperature sensor for high temperature in which the occurrence of a break in platinum lead wires is extremely lower than in conventional examples, when used at a high temperature, and, furthermore, in which the occurrence of a break in the platinum lead wires is extremely lower than in conventional examples, even when used in an environment where the temperature repeatedly and significantly changes between a high temperature and a low temperature.

MODES FOR CARRYING OUT THE INVENTION

First Embodiment

Figure 1:
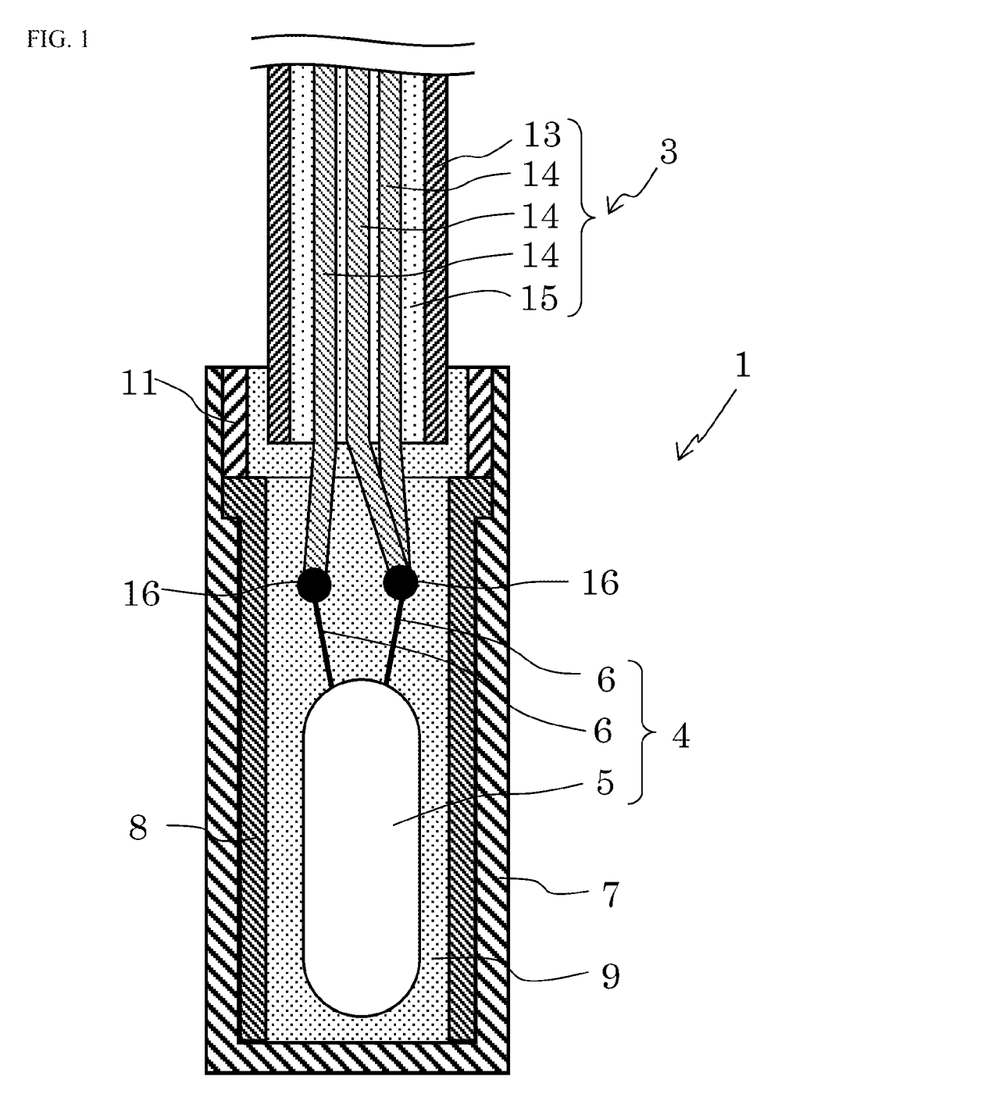
FIG. 1 is a cross-sectional view showing a first embodiment of a temperature sensor for high temperature according to the present invention.
Figure 3:
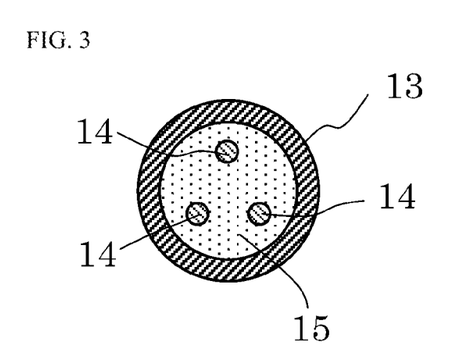
FIG. 3 is a cross-sectional view in the radial direction of an MI cable that is connected to the temperature sensor for high temperature.

FIG. 1 shows a first embodiment of a temperature sensor for high temperature according to the present invention. Although FIG. 1 is a cross-sectional view, a platinum resistance thermometer element main body 5 is shown in the external shape thereof. Furthermore, FIG. 3 shows a cross-sectional view in the radial direction of an MI cable 3 that is connected to a temperature sensor 1 for high temperature. Hereinafter, the first embodiment will be described with reference to FIGS. 1 and 3.

The temperature sensor 1 for high temperature is configured by a platinum resistance thermometer element 4, an inner frame 8, an outer frame 7, and an inner frame fixing member 11, and is provided at an end of the MI cable 3.

The outer frame 7 is made of metal, and has a bottomed cylindrical shape inside of which the inner frame 8 is provided. The outer side face of inner frame 8 is roughly in contact with the inner side face of the outer frame 7, and the lower end face of the inner frame 8 is roughly in contact with the inner face of the bottom of the outer frame 7.

The platinum resistance thermometer element 4 in which platinum lead wires 6 are exposed from the platinum resistance thermometer element main body 5 is positioned inside the inner frame 8. The platinum resistance thermometer element main body 5 is a portion containing a platinum resistance wire for measuring the temperature. In the drawing, the exposed portions of the platinum lead wires 6 joined to the platinum resistance wire are shown.

A ring-like flange protrudes from the upper end of the inner frame 8, and a step is formed in the inner face of the outer frame 7 by reducing the wall thickness of the upper portion of the outer frame 7. In a state where the flange on the inner frame 8 is caught on the step on the inner face of the outer frame 7 and the inner frame 8 is suspended on the outer frame 7, the upper face of the flange is pressed by the metal inner frame fixing member 11 in the shape of a cylinder, so that the upper end portion of the inner frame 8 is fixed to the outer frame 7. The inner frame fixing member 11 is fixed by welding to the outer frame 7. The inner frame fixing member 11 may be fixed by brazing to the outer frame 7.

Ends of the platinum lead wires 6 are joined by welding to ends 16 of three electric conductive wires 14 stripped out of a metal sheath 13 of the MI cable 3 in which the three electric conductive wires 14 are accommodated via an inorganic insulating powder 15 in the metal sheath 13. The temperature is measured by the platinum resistance thermometer element 4 using three-wire measurement, and, thus, the number of electric conductive wires 14 of the MI cable 3 is three.

The inside of the inner frame 8 and a portion inside the outer frame 7 where the inner frame 8 is not present are filled with an insulating filler 9.

In the first embodiment, the outer frame 7 and the inner frame 8 each have a cylindrical shape, but may have a tubular shape with a quadrangular or other cross-section, and the inner frame 8 may have a bottomed shape. The shape of the inner frame fixing member 11 is not absolutely limited to a cylindrical shape, as long as the flange on the inner frame 8 can be fixed. Furthermore, the platinum resistance thermometer element main body 5 may be of any type, such as an element in which a coiled platinum resistance wire is accommodated in a ceramic insulator, an element in which a platinum resistance wire wound around a glass bobbin is coated by glass, or an element in which a platinum thin film in the form of a meandering wire is formed on a thin film made of ceramic or the like to form a platinum resistance wire, and the surface thereof is insulated by coating.

Furthermore, the number of platinum resistance thermometer elements 4 is not limited to one, and a plurality of platinum resistance thermometer elements may be electrically connected in series by a platinum wire. Five 100Ω platinum resistance thermometer elements connected in series correspond to one 500Ω platinum resistance thermometer element.

Next, the materials used in a manufacture example of this embodiment will be described. The outer frame 7, the inner frame fixing member 11, and the metal sheath 13 were formed from NCF600, but may be formed from other metal such as SUS304 or SUS316 stainless steel. The electric conductive wires 14 were formed from nickel alloy containing a trace amount of other metal, but may be formed from other metal such as NCF600.

The insulating filler 9 was formed from a ceramic adhesive mainly made of alumina, and the inner frame 8 was formed from ceramic made of alumina. Since alumina has a coefficient of thermal expansion close to that of platinum, the platinum lead wires 6 can be effectively prevented from being broken.

The insulating filler 9 may be formed from a ceramic adhesive mainly made of zirconia or a mixture of alumina and zirconia, both of which, like alumina, have a coefficient of thermal expansion close to that of platinum. Alternatively, a ceramic powder made of alumina, zirconia, or a mixture of alumina and zirconia, tightly filled at a high density, may be used as the insulating filler 9. However, such a ceramic powder may absorb moisture and deteriorate in the insulation resistance, causing errors in the temperature measurement. Thus, when the ceramic powder is used as the insulating filler 9, it is desirable that an opening at the upper portion of the outer frame 7 is provided with a metal lid, and the lid is welded or brazed to the outer frame 7 and the metal sheath 13 of the MI cable 3, so that the inside of the outer frame 7 is shielded from the outside air.

Also, the inner frame 8 may be formed from ceramic made of zirconia or a mixture of alumina and zirconia, both of which have a coefficient of thermal expansion close to that of platinum.

The inorganic insulating powder 15 of the MI cable 3 was made of magnesia, but may be made of other material such as alumina.

In the temperature sensor 1 for high temperature of this embodiment, the inner frame 8 is fixed, only at the upper end portion thereof, to the outer frame 7. Thus, when the outer frame 7 and the inner frame 8 are heated and expanded at different degrees, the inner frame 8 slides about the fixed portion thereof functioning as a fulcrum, relative to the outer frame 7. Accordingly, the inner frame 8 is not pulled by significant thermal expansion of the outer frame 7. That is, contrary to conventional examples in which stress is generated in the platinum lead wires 6 by the influence of thermal expansion of the outer frame 7, such stress is not generated in the platinum lead wires 6 according to this embodiment. Furthermore, there is almost no stress from the insulating filler 9 to the platinum lead wires 6, because the inner frame 8 and the insulating filler 9 are made of or mainly made of alumina or zirconia, both of which, among ceramic materials, have a coefficient of thermal expansion extremely close to that of platinum. Thus, even when used in a high temperature environment or in an environment where the temperature repeatedly and significantly changes between a high temperature and a low temperature, the platinum lead wires 6 can be substantially prevented from being broken. Furthermore, also in a case where the platinum resistance thermometer element 4 is configured by a plurality of platinum resistance thermometer elements that are electrically connected in series by a platinum wire, this platinum wire can be substantially prevented from being broken in a similar manner.

According to this embodiment, most portion of the electric conductive wires 14 stripped out of the metal sheath 13 of the MI cable 3 is inside the inner frame 8. The electric conductive wires 14 are usually formed from nickel or nickel alloy, both of which have a coefficient of thermal expansion close to that of NCF600 or stainless steel forming the outer frame 7. However, these materials forming the electric conductive wires 14 have a coefficient of thermal expansion larger than that of materials of which the inner frame 8 and the insulating filler 9 are made or mainly made, and tensile stress is hardly generated, and, furthermore, the electric conductive wires 14 used are thicker than the platinum lead wires 6, so that the electric conductive wires 14 are rarely broken even when they are inside the inner frame 8 having a small coefficient of thermal expansion.

In view of thermal resistance, there are platinum resistance thermometer elements 4 that can be used at a high temperature of approximately 1000° C., if an increase in the errors to some extent is allowed, and all materials forming the constituent members other than the platinum resistance thermometer element 4 in the temperature sensor 1 for high temperature are resistant to heat at a temperature of approximately 1000° C., and, thus, the temperature sensor 1 for high temperature can be used in a high temperature range up to approximately 1000° C. In addition, since the platinum resistance thermometer element 4 that is fragile is protected by the metal outer frame 7, the temperature sensor 1 for high temperature can be used in an environment where an external force such as vibrations is applied.

Second Embodiment

Figure 2:
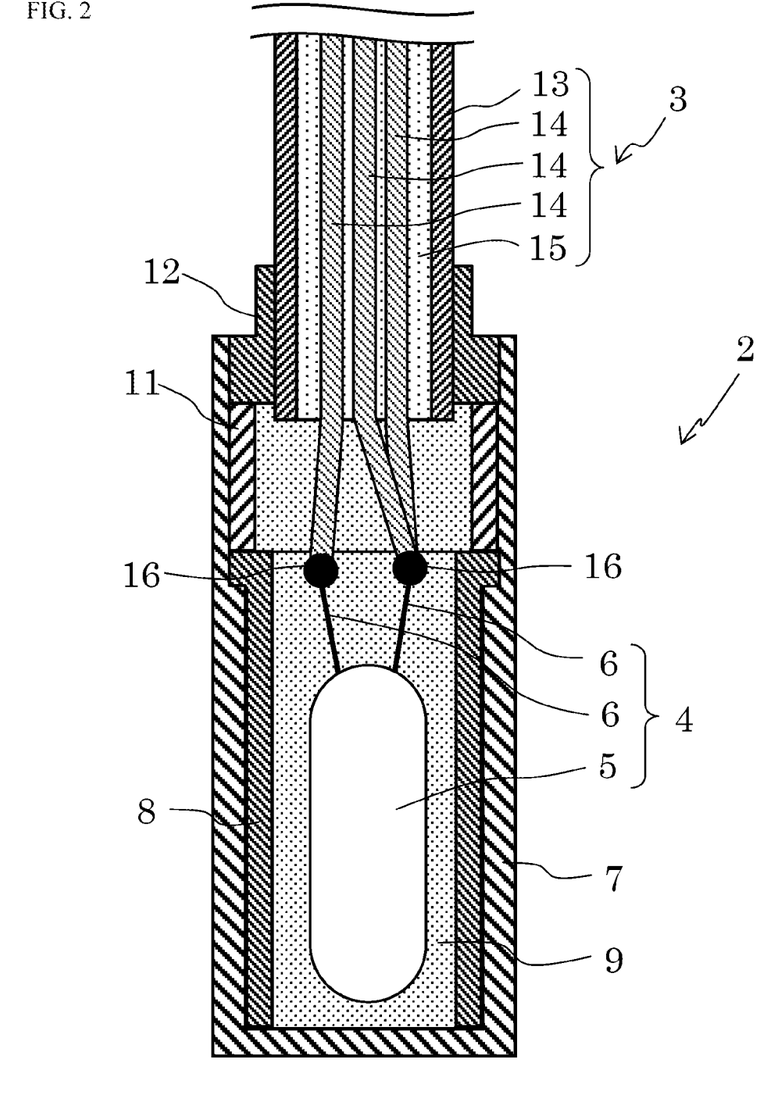
FIG. 2 is a cross-sectional view showing a second embodiment of the temperature sensor for high temperature.

FIG. 2 shows a second embodiment of the temperature sensor for high temperature according to the present invention. Although FIG. 2 is a cross-sectional view, the platinum resistance thermometer element main body 5 is shown in the external shape thereof. Furthermore, FIG. 3 shows a cross-sectional view in the radial direction of the MI cable 3 that is connected to a temperature sensor 2 for high temperature. Hereinafter, the second embodiment will be described with reference to FIGS. 2 and 3.

Hereinafter, a description will be given focusing on differences from the first embodiment. Features, effects, and the like of the second embodiment other than the differences are similar to those of the first embodiment.

As shown in FIG. 2, the second embodiment is different from the first embodiment in that a metal lid 12 is additionally provided as a constituent member, and in that a position in the axial direction at which the upper end portion of the inner frame 8 is fixed to the outer frame 7 substantially matches a position at which the ends of the platinum lead wires 6 and the electric conductive wires 14 of the MI cable 3 are joined to each other.

The lid 12 is attached by welding around the entire circumference thereof to the outer frame 7 and the metal sheath 13 of the MI cable 3, so that the inside of the outer frame 7 is shielded from the outside air. The attachment may be performed not by welding around the entire circumference but by brazing around the entire circumference.

According to this embodiment, the inside of the outer frame 7 is shielded from the outside air. Thus, even when a ceramic powder is used as the insulating filler 9, there is no possibility that moisture is absorbed and lowers the insulating performance, contrary to the first embodiment.

Furthermore, contrary to the first embodiment, in order to fix the upper end portion of the inner frame 8 to the outer frame 7, it is not absolutely necessary to weld or braze the inner frame fixing member 11 to the outer frame 7. In a manufacture example of this embodiment, in a state where the inner frame fixing member 11 was pressed by the lid 12 from above, the lid 12 was welded to the outer frame 7 and the metal sheath 13 of the MI cable 3, so that the upper end portion of the inner frame 8 was fixed to the outer frame 7. A specific welding procedure is such that the lid 12 is first welded to the metal sheath 13, after which, in a state where the inner frame fixing member 11 is pressed by the lid 12 from above, the lid 12 is welded to the outer frame 7. The inner frame fixing member 11 is not welded or brazed to the outer frame 7.

The lid 12 is formed from NCF600, which is the same material as the outer frame 7, but may be formed from other metal such as SUS304 or SUS316 stainless steel. Furthermore, in a case where welding or brazing to the outer frame 7 is not performed, the inner frame fixing member 11 does not necessarily have to be made of metal, and may be made of ceramic.

This embodiment is different from the first embodiment in that a position in the axial direction at which the upper end portion of the inner frame 8 is fixed to the outer frame 7 substantially matches a position at which the ends of the platinum lead wires 6 and the electric conductive wires 14 of the MI cable 3 are joined to each other.

The electric conductive wires 14 of the MI cable 3 for high temperature are usually formed from nickel or nickel alloy, and, according to this embodiment, they are formed from nickel alloy as described above. These materials each have a coefficient of thermal expansion closer to that of the metal forming the outer frame 7 than to ceramic, such as alumina or zirconia, of which the inner frame 8 and the insulating filler 9 are made or mainly made, and, thus, according to this embodiment, stress generated in the electric conductive wires 14 stripped out of the metal sheath 13 of the MI cable 3 is reduced, and a break in the electric conductive wires 14, which occurs only rarely, can be prevented.

This feature is applicable also to the first embodiment. That is to say, in FIG. 1 showing the first embodiment, if a position in the axial direction of the upper end portion of the inner frame 8 substantially matches a position at which the ends of the platinum lead wires 6 and the electric conductive wires 14 of the MI cable 3 are joined to each other, a break in the electric conductive wires 14, which occurs only rarely, can be prevented as in the second embodiment.

Note that, in the structure of the embodiment shown in FIG. 2, the inner frame fixing member 11 may be formed in one piece with the inner frame 8. In this case, the electric conductive wires 14 stripped out of the metal sheath 13 of the MI cable 3 are positioned inside the inner frame 8 made of ceramic having a small coefficient of thermal expansion, and, thus, the effect of preventing a break in the electric conductive wires 14 cannot be obtained, but this configuration is economically advantageous because the number of constituent members is reduced.

According to this embodiment, the platinum lead wires 6 are not broken as in the first embodiment. Furthermore, also in a case where the platinum resistance thermometer element 4 is configured by a plurality of platinum resistance thermometer elements that are electrically connected in series by a platinum wire, this platinum wire is not broken as in the first embodiment.

(Thermal Cycling Test)

In order to check the effects of the present invention, the temperature sensor 2 for high temperature of the second embodiment shown in FIG. 2 was subjected to a thermal cycling test.

The platinum resistance thermometer element 4 of the temperature sensor 2 for high temperature subjected to the test was formed as follows. That is, five 100Ω platinum resistance thermometer elements, in each of which a platinum thin film in the form of a meandering wire was formed on a thin film made of ceramic or the like to form a platinum resistance wire, and the surface thereof was insulated by coating, were electrically connected in series by a platinum wire, forming the platinum resistance thermometer element 4. The outer frame 7 had an outer diameter of about 6 mm, and a length in the axial direction of about 16 mm.

The materials forming the constituent members were as described above. In summary, the outer frame 7, the inner frame fixing member 11, and the lid 12 were formed from NCF600, the inner frame 8 was formed from ceramic made of alumina, and the insulating filler 9 was formed from a ceramic adhesive mainly made of alumina.

Six temperature sensors 2 for high temperature were prepared, and were each subjected to 2000 thermal cycles in which the temperature was repeatedly increased and decreased between room temperature and 930° C. With these thermal cycles, the platinum lead wires 6 of conventional examples had been broken, whereas in the six temperature sensors 2, none of the platinum lead wires 6 was broken, and no other portion was broken or damaged. With this result, it was confirmed that the present invention is effective.

The embodiments disclosed herein are to be considered in all respects as illustrative and not limiting. The scope of the invention is indicated by the appended claims rather than by the foregoing description. All changes which come within the meaning and range of equivalency of the claims are intended to be embraced therein.

INDUSTRIAL APPLICABILITY

The temperature sensor for high temperature of the present invention is suitable as a sensor for measuring the temperature of an object in which the temperature is high and frequently changes. Specifically, this temperature sensor can be preferably used as a temperature sensor for monitoring the temperature of a catalyst tank of a thruster engine provided on a satellite, a temperature sensor for controlling the temperature of a small electric furnace in which the temperature significantly changes, and the like.

DESCRIPTION OF REFERENCE NUMERALS

Temperature sensor for high temperature (first embodiment)
Temperature sensor for high temperature (second embodiment)
MI cable
Platinum resistance thermometer element
Platinum resistance thermometer element main body
Platinum lead wire
Outer frame
Inner frame
Insulating filler
Inner frame fixing member
Lid
Metal sheath
Electric conductive wire
Inorganic insulating powder

What is claimed is:

1. A temperature sensor for high temperature, provided at an end of an MI cable in which electric conductive wires are accommodated via an inorganic insulating powder in a metal sheath, comprising:
an outer frame made of metal, and having a bottomed tubular shape;
an inner frame made of ceramic, having a bottomed or non-bottomed tubular shape, and disposed inside the outer frame in a state where the inner frame is roughly in contact, at an outer side face thereof, with an inner side face of the outer frame, is roughly in contact, at a lower end face thereof, with an inner face of a bottom of the outer frame, and is fixed, at an upper end portion thereof, to the outer frame;
a platinum resistance thermometer element disposed inside the inner frame, comprising a platinum resistance thermometer element main body containing a platinum resistance wire, and platinum lead wires joined to the platinum resistance wire and partially exposed from the platinum resistance thermometer element main body, wherein ends of the platinum lead wires exposed from the platinum resistance thermometer element main body are joined to the electric conductive wires of the MI cable;
an insulating filler made of a ceramic adhesive or a ceramic powder tightly filled at a high density, and filled inside the inner frame and a portion inside the outer frame where the inner frame is not present; and
a lid that is made of metal, and is attached to an opening at an upper portion of the outer frame,
wherein the inner frame is provided, on an outer face of the upper end portion thereof, with a flange,
the outer frame is provided, in an inner face of an upper portion thereof, with a step, by reducing a wall thickness of the upper portion, and
the upper end portion of the inner frame is fixed to the outer frame, and the inside of the outer frame is shielded from the outside air, by welding or brazing the lid to the outer frame and the metal sheath of the MI cable in a state where the flange on the inner frame is caught on the step in the outer frame and the inner frame is suspended on the outer frame, the lid is attached to an upper portion of the flange of the inner frame, and the upper face of the inner frame is pressed by the lid.

2. The temperature sensor for high temperature according to claim 1, wherein a material forming the inner frame, and a main material forming the ceramic adhesive of the insulating filler or a material forming the ceramic powder of the insulating filler are any of alumina, zirconia, and a mixture of alumina and zirconia.

3. The temperature sensor for high temperature according to claim 1, further comprising:
an inner frame fixing member that is made of metal, and presses an upper face of the inner frame;
wherein the inner frame is provided, on an outer face of the upper end portion thereof, with a flange,
the outer frame is provided, in an inner face of an upper portion thereof, with a step, by reducing a wall thickness of the upper portion, and
the upper end portion of the inner frame is fixed to the outer frame by welding or brazing the inner frame fixing member and the outer frame to each other in a state where the flange on the inner frame is caught on the step in the outer frame and the inner frame is suspended on the outer frame, and an upper face of the flange on the inner frame is pressed by the inner frame fixing member.

4. The temperature sensor for high temperature according to claim 1, further comprising:
a lid that is made of metal, and is attached to an opening at an upper portion of the outer frame;

wherein the inside of the outer frame is shielded from the outside air by welding or brazing the lid to the outer frame and the metal sheath of the MI cable.

5. The temperature sensor for high temperature according to claim 1, further comprising an inner frame fixing member that presses an upper face of the inner frame with the lid,
wherein the upper end portion of the inner frame is fixed to the outer frame, and the inside of the outer frame is shielded from the outside air, by welding or brazing the lid to the outer frame and the metal sheath of the MI cable in a state where the inner frame fixing member is placed on an upper face of the flange on the inner frame, the lid is attached to an upper face of the inner frame fixing member, and the upper face of the inner frame fixing member is pressed by the lid.

6. The temperature sensor for high temperature according to claim 1, wherein the platinum resistance thermometer element disposed inside the inner frame comprises a plurality of platinum resistance thermometer elements that are connected in series by a platinum wire.

* * * * *

UNITED STATES PATENT AND TRADEMARK OFFICE
CERTIFICATE OF CORRECTION

PATENT NO. : 9,927,303 B2
APPLICATION NO. : 14/415015
DATED : March 27, 2018
INVENTOR(S) : Mitsuaki Mochizuki et al.

It is certified that error appears in the above-identified patent and that said Letters Patent is hereby corrected as shown below:

In the Specification

Column 1, Line 22, "JP 557-126035U" should be -- JP S57-126035U --.

Column 1, Line 24, "JP 544-29830B" should be -- JP S44-29830B --.

Column 11, Lines 45-59, should be numbered as such:
-- 1 Temperature sensor for high temperature (first embodiment)
2 Temperature sensor for high temperature (second embodiment)
3 MI cable
4 Platinum resistance thermometer element
5 Platinum resistance thermometer element main body
6 Platinum lead wire
7 Outer frame
8 Inner frame
9 Insulating filler
11 Inner frame fixing member
12 Lid
13 Metal sheath
14 Electric conductive wire
15 Inorganic insulating powder --.

Signed and Sealed this
Twelfth Day of June, 2018

Andrei Iancu
*Director of the United States Patent and Trademark Office*